United States Patent [19]
Furukawa et al.

[11] 3,893,104
[45] July 1, 1975

[54] ANALOGUE-DIGITAL VOLTAGE MEASURING APPARATUS

[75] Inventors: Hikaru Furukawa; Shozo Kumazawa; Noriyuki Wakayama, all of Gyoda, Japan

[73] Assignee: Takeda Riken Industry Company Limited, Tokyo, Japan

[22] Filed: June 12, 1973

[21] Appl. No.: 369,126

[30] Foreign Application Priority Data
June 13, 1972 Japan.................................. 47-58240

[52] U.S. Cl. .......................... 340/347 AD; 324/99 D
[51] Int. Cl. ............................................. H03k 13/02
[58] Field of Search .............. 340/347 AD; 307/309; 324/99 D, 115, 116

[56] References Cited
UNITED STATES PATENTS 3,522,598  8/1970  Sokolich ..................... 340/347 AD
3,656,153  4/1972  Takeda et al. ............... 340/347 AD

*Primary Examiner*—Thomas J. Sloyan
*Attorney, Agent, or Firm*—William J. Daniel

[57] ABSTRACT

An apparatus for improving the operation of a digital voltmeter by eliminating a large time delay before an equilibrium state is reached due to the hysteresis phenomenon of a magnetic core used in the circuit, automatically by first switching a tap of a switching winding to effect coarse cancellation of the major component of the flux using an analogue-digital converter to determine the magnitude of this component and control selection of the proper tap, and then subsequently determining the magnitude of the remaining flux in the core using the same analogue-digital converter, the apparatus including a multiple-digit display in which the first-determined component is displayed in the most significant digits and the subsequently-determined magnitude is displayed in the least significant digits.

2 Claims, 1 Drawing Figure

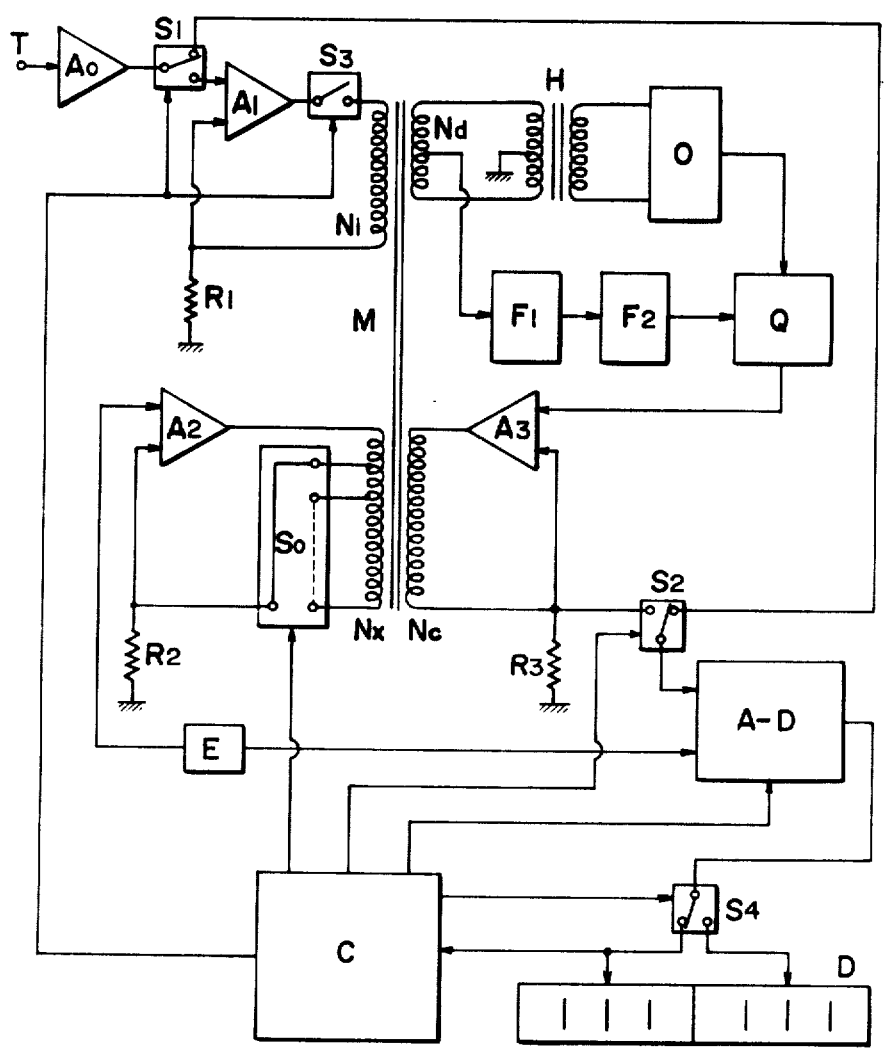

ANALOGUE-DIGITAL VOLTAGE MEASURING APPARATUS

This invention relates to analogue-digital converting apparatus.

In an analogue-digital converting apparatus of the type used in providing a digital voltmeter or the like, it is possible by separating more significant digits and less significant digits from each other to obtain a conversion of high precision within a short measuring time. More specifically an analogue digital converting apparatus is used having a common magnetic core provided with an input winding to which an unknown input current is applied. Moreover a switching winding having a switchable number of turns and a fixed winding having a fixed number of turns are wound on said magnetic core together with a magnetic flux detecting winding and circuitry. A fixed reference current is made to flow through the switching winding, and the fixed winding current is adjusted so that the output of the detecting means will become zero, the number of turns of the switchable winding having been determined by the digital value of the most significant digits based on an initial measurement of the unknown input to the apparatus, and the fixed winding current required to fully cancel the flux in the core is converted to a digital quantity to be displayed as the least significant digits. The most significant are determined by the number of turns selected for the switchable winding so that they should exhibit no fluctuation at all, and therefore the operation is very stable and the noise of the magnetic core at null is so small that a high precision conversion can be made.

However, the automatic control of a fixed winding current has been made according to the prior art for the purpose of cancelling the flux in the core by initially reducing the sensitivity of the magnetic flux detecting element and initially interrupting the current flow in the switching winding, and then using only the fixed winding current for adjusting the output of the magnetic flux detecting element to be zero. It is only subsequently that the prior art resorts to automatically switching the number of turns of the switching winding. In such apparatus, when an unknown current is applied to the input winding, a large magnetic flux will be generated in the magnetic core. Therefore, because of the hystersis phenomenon of the magnetic core, the precision of the measurement will be reduced and a long time delay will be produced in the response of the magnetic flux detecting circuit. Therefore, a comparatively long time has been required for one converting operation.

An object of the present invention is to provide an apparatus wherein such disadvantages as are described above are eliminated by first, rather than subsequently, switching the tap of the switching winding under the control of analogue-digital converter.

The drawing is a block diagram showing an embodiment of the present invention.

An unknown voltage to be converted to a digital quantity is applied to a terminal T, and this voltage is first applied to proper integration type analogue-digital converter A-D through an operational amplifier $A_o$ and switches $S_1$ and $S_2$. A fixed comparison voltage is applied to this converter A-D from a reference electric source E. Thereupon a starting signal is applied to the above mentioned A/D converter from a controller C, and the input voltage of the terminal T is then converted to a digital quantity of four digits, and these four digits are indicated in the four most significant digit positions in the indicator D. At the same time, the digital quantity will be applied to the controller C and a switch $S_o$ will be switched by said controller. That is to say, the tap of a switching winding $N_r$ wound on the magnetic core M will be selectively positioned so that the resulting selected number of turns will provide a counterflux through the core proportional to the digital magnitude of the above mentioned four digits. Simultaneously with this operation, a signal will be applied to the switches $S_1$ and $S_3$ from the controller C so that the switch $S_1$ will be reversed and the switch $S_3$ will be closed. Therefore, the output of the operational amplifier $A_o$ will be applied to the input winding $N_i$ of the magnetic core M through a first terminal of a differential amplifier $A_1$, and so that a voltage drop produced in a resistance $R_1$ by its winding current will be applied to the second terminal of the above mentioned amplifier $A_1$ as its other input. Therefore, if the gain of the amplifier $A_1$ is large enough, an electric current proportional to the first input voltage will flow through the winding $N_i$. Further, the output voltage of the above mentioned reference source E will also be applied to a differential amplifier $A_2$, and its output current will flow through the switching winding $N_r$ and resistance $R_2$, and the voltage drop of the resistance $R_2$ will be applied to the amplifier $A_2$ as its other input. Therefore, if the amplification degree of said amplifier $A_2$ is large enough, a fixed current determined by the resistance $R_2$ and the voltage of the electric source E will flow through the switching winding $N_r$. Therefore, if the magnitude and polarity are properly selected in advance, the magnetic flux generated in the magnetic core M by the current of the winding $N_i$ will be almost cancelled by the counter magnetic flux generated by the current of the winding $N_r$. The latter fluxes will so nearly cancel each other that only a magnetic flux smaller than the quantity corresponding to the least significant four digits in the above mentioned display will remain.

Then, subsequently, the controller C will apply a switching or starting signal to the switch $S_2$, to the analogue-digital converter A-D and to the switch $S_4$. Further, the output frequency f of an oscillator O is applied to the detecting winding Nd of the magnetic flux detecting element through a transformer H, the secondary winding in said transformer being grounded at the neutral point, and the output of the neutral point of the winding Nd is applied to a synchronous demodulator Q through filters $F_1$ and $F_1$, the demodulator Q being synchronously controlled with the output of the oscillator O.

By the way, when the output frequency of the oscillator O is made f, the filter $F_1$ will pass only the signal of a frequency of 2f and the filter $F_2$ will block the signal of a frequency of $f$. Therefore, the signal of a frequency of 2f will be applied to the demodulator Q but, since the amplitude of this signal corresponds to the magnitude of the direct current magnetic flux remaining uncancelled in the magnetic core M, the demodulator Q will send out a direct current output proportional to the above mentioned remaining magnetic flux. The output will be applied to a differential amplifier $A_3$, and the output of said amplifier will flow through a fixed winding Nc having a fixed number of turns and a resistance $R_3$, and the voltage drop of the resistance $R_3$ will be applied to the amplifier $A_3$ as its other input. Therefore, if the gain of the amplifier $A_3$ and the sensitivity of the magnetic flux detecting circuit consisting of the magnetic flux detecting winding N$d$ and demodulator Q are large enough, an automatic adjustment of the current through the fixed winding Nc will be made so that the remaining magnetic flux in the magnetic core M will be precisely cancelled by the current flowing through the fixed winding Nc. By the action of this control circuit, the current flowing through the fixed winding Nc will be converted to a voltage across by the resistance $R_3$ and the voltage will be applied to the analogue-digital converter A-D through the switch $S_2$. As the above mentioned converter A-D, has again been actuated by the controller C at this time, the current flowing through the fixed winding Nc will be converted to a digital quantity of four digits and will be indicated in the less significant four digits of the indicator D through a switch $S_4$.

Summarizing the operation described above, the magnetic flux generated in the magnetic core M by the current of the input winding N$i$ will have a major portion of its total value corresponding to the most significant four digits of the display canceled by the current of the switching winding N$x$, and only the magnetic flux corresponding to the less significant four digits will remain. Then, by the operation of this remaining magnetic flux detecting circuit, such current as will precisely cancel the above mentioned residual magnetic flux will flow through the fixed winding Nc and will be converted to the digital quantity represented by the less significant four digits using the integration type analogue-digital converter A-D.

Therefore, in the indicator D, the input of the terminal T will be indicated as a digital quantity of 8 digits. The apparatus of the present invention does this by first determining a digital quantity for the four most significant digit positions using the analogue-digital converter A-D. Using this value, the switching winding N$x$ is accordingly tap-switched. Therefore, by simultaneously applying a current to the input winding N$i$ and switching winding N$x$, the magnetic flux of the magnetic core M can be substantially canceled. That is to say, since no large magnetic flux remains in the magnetic core M, the present apparatus avoids the problem which would otherwise result in a large integrating time delay before an equilibrium state is reached because of the hysteresis phenomenon of the magnetic core. Further, since the operation of the above mentioned automatic control circuit is carried out quickly, the time required for the conversion can be reduced. Also errors based on the hysteresis phenomenon are prevented, an accurate conversion can be made, and it is not likely that an excessively large input will be applied to the amplifier $A_3$ and demodulator Q and therefore it is easy to design them.

What is claimed is:

1. Apparatus for determining the level of an analogue input and displaying it on a digital display having multiple digital positions including more significant digits and less-significant digits, comprising:

an input terminal;

a magnetic core having thereon an input winding, having a fixed winding, having a switching winding including switching means for selecting one of multiple taps, and having a magnetic flux detecting element;

a fixed reference potential source;

first means coupled to said source and operative to pass a constant current through said switching winding for the purpose of substantially cancelling the flux in the core;

an analogue-to-digital converter having an output; flux detecting means connected to said element and operative to deliver a dc signal representative of the flux level in said core;

second means coupled to the source and operative to pass a current through the fixed winding for the purpose of cancelling the remaining flux in the core; and controller circuitry sequentially operative initially to connect said converter to said terminal to produce an initial output measurement of said analogue input and to couple said initial output for display to said more significant digit positions and to couple said initial output to said winding switching means to select a tap representing a number of turns proportional to the magnitude of said output, and the controller circuitry being operative subsequently to couple said terminal to said input winding and to couple said converter to receive a level proportional to said dc signal from said flux detecting means and to produce a subsequent output representing said remaining flux in the core and to couple said subsequent output to said less-significant digit positions for display.

2. Apparatus as claimed in claim 1, wherein said magnetic flux detecting element comprises a winding coupled to said flux detecting means.

* * * * *